United States Patent
Gupta et al.

(10) Patent No.: US 11,617,008 B1
(45) Date of Patent: Mar. 28, 2023

(54) MEDIA CLASSIFICATION USING LOCAL AND GLOBAL AUDIO FEATURES

(71) Applicant: Amazon Technologies, Inc., Seattle, WA (US)

(72) Inventors: Tarun Gupta, Seattle, WA (US); Mayank Sharma, Madhya Pradesh (IN); Xiang Hao, Kenmore, WA (US); Muhammad Raffay Hamid, Seattle, WA (US); Zhitao Qiu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 17/218,009

(22) Filed: Mar. 30, 2021

(51) Int. Cl.
| H04N 21/439 | (2011.01) |
| G06N 20/00 | (2019.01) |
| H04N 21/466 | (2011.01) |
| H04N 21/475 | (2011.01) |

(52) U.S. Cl.
CPC ......... *H04N 21/4394* (2013.01); *G06N 20/00* (2019.01); *H04N 21/4665* (2013.01); *H04N 21/4756* (2013.01)

(58) Field of Classification Search
None
See application file for complete search history.

(56) References Cited

U.S. PATENT DOCUMENTS

| 8,677,409 | B2 | 3/2014 | Yu |
| 9,336,308 | B2 | 5/2016 | Yu |
| 9,607,656 | B1 | 3/2017 | Serce |
| 9,674,588 | B2 | 6/2017 | Yu |
| 9,747,497 | B1 | 8/2017 | Sharma et al. |
| 9,930,376 | B2 | 3/2018 | Pikes et al. |
| 10,075,763 | B2 | 9/2018 | Wilms et al. |
| 10,154,291 | B2 | 12/2018 | Pikes et al. |
| 10,194,199 | B2 | 1/2019 | Yu |
| 10,643,074 | B1 | 5/2020 | McAninly et al. |

OTHER PUBLICATIONS

Joe Yue-Hei Ng, et al., "Beyond Short Snippets: Deep Networks for Video Classification", arXiv:1503.08909v2, Apr. 13, 2015, pp. 1-9.
Justin Salamon, et al., "Deep Convolutional Neural Networks and Data Augmentation for Environmental Sound Classification", IEEE Signal Processing Letters, Accepted Nov. 2016, arXiv:1608.04363v2, Nov. 28, 2016, pp. 1-5.

(Continued)

*Primary Examiner* — Omar S Parra
(74) *Attorney, Agent, or Firm* — Robert C. Kowert; Kowert, Hood, Munyon, Rankin & Goetzel, P.C.

(57) ABSTRACT

Methods, systems, and computer-readable media for media classification using local and global audio features are disclosed. A media classification system determines local features of an audio input using an audio event detector model that is trained to detect a plurality of audio event classes descriptive of objectionable content. The local features are extracted using maximum values of audio event scores for individual audio event classes. The media classification system determines one or more global features of the audio input using the audio event detector model. The global feature(s) are extracted using averaging of clip-level descriptors of a plurality of clips of the audio input. The media classification system determines a content-based rating for media comprising the audio input based (at least in part) on the local features of the audio input and based (at least in part) on the global feature(s) of the audio input.

20 Claims, 8 Drawing Sheets

(56) References Cited

OTHER PUBLICATIONS

Eduardo Fonseca, et al., "Audio Tagging with Noisy Labels and Minimal Supervision", Detection and Clasification of Acoustic Scenes and Events 2019, arXiv:1906.02975v4, Jan. 20, 2020, pp. 1-5.

Andrej Karpathy, et al., "Large-scale Video Classification with Convolutional Neural Networks", In 2014 IEEE Conference on Computer Vision and Pattern Recognition, Jun. 2014, pp. 1-8.

Yakaiah Ptharaju, et al., "Classification of Ontological Violence Content Detection Through Audio Features and Supervised Learning", in International Journal of Intelligent Engineering & Systems, Oct. 17, 2018, pp. 20-30.

Wojtek Zajdel, et al., "Cassandra: audio-video sensor fusion for aggression detection", ResearchGate, IEEE International Conference on Advanced Video and Signal Based Surveillance (AVSS), 2007, pp. 1-7.

Markus Schedl, et al., "VSD2014: A Dataset for Violent Scenes Detection in Hollywood Movies and Web Videos", In 13th International Workshop on Content-Based Multimedia Indexing (CBMI), Jul. 2015, pp. 1-6.

Wen-Huang Cheng, et al., "Semantic context detection based on hierarchical audio models", ResearchGate, MIR'03, Nov. 7, 2003, pp. 109-115.

Theodoros Giannakopoulos, et al., "Audio-Visual Fusion for Detecting Violent Scenes in Videos", In Artificial Intelligence: Theories, Models and Applications, 6th Hellenic Conference on AI, SETN 2010, Athens, Greece, May 2010, pp. 91-100.

Jian Lin, et al., "Weakly-Supervised Violence Detection in Movies with Audio and Video Based Co-training", ResearchGate, In Advances in Multimedia Information Processing (PCM 2009), 10th Pacific Rim Conference on Multimedia, Bangkok, Thailand, Dec. 2009, pp. 930-935.

Heng-Tze Cheng, et al., "Wide & Deep Learning for Recommender Systems", ResearchGate, In Proceedings of the 1st Workshop on Deep Learning for Recommender Systems, Sep. 2016, pp. 1-5.

MEDIA CLASSIFICATION USING LOCAL AND GLOBAL AUDIO FEATURES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, distributed systems may be used to provide clients access to media libraries that are hosted in the cloud. As the scale and scope of distributed systems have increased, the tasks of provisioning, administering, and managing system resources have become increasingly complicated.

Figure 1:
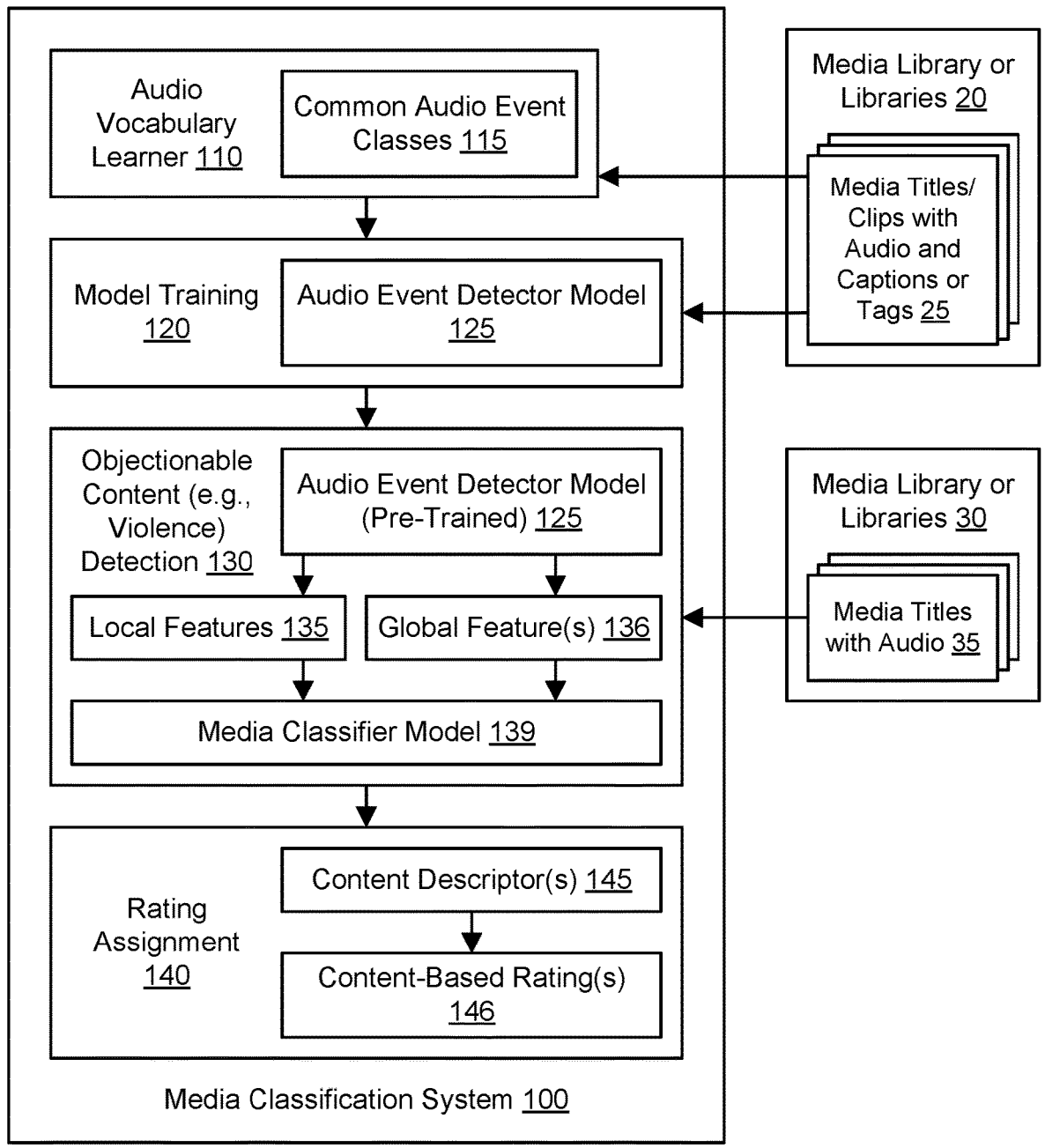
FIG. 1 illustrates an example system environment for media classification using local and global audio features, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for media classification using local and global audio features are described. Streaming services and other media providers may provide large libraries of content such as movies, episodes of television shows, short films, user-uploaded videos, and so on. To allow for informed viewing decisions on a per-title basis, individual titles may be associated with content-based ratings that represent appropriate age designations or maturity ratings. Prior approaches to generating content-based ratings have included manual review of titles for objectionable content in various content descriptors (e.g., sexuality, violence, offensive language, and substance use). For example, to manually generate a content-based rating value for a title, an operator may look for elements related to each content descriptor and may assign one of five severity levels (e.g., None, Mild, Moderate, Strong, or Severe) to the elements found in the title. The highest content descriptor severity may be mapped to a corresponding content-based rating value (e.g., all ages, 7+, 13+, 16+ and 18+) that represents the overall maturity level of the title. However, the manual review process may be expensive and time-consuming. The manual review process may also yield inaccurate results, e.g., due to the subjectivity of different reviewers.

The aforementioned challenges, among others, are addressed by embodiments of the techniques described herein, whereby automated techniques may be used for accurately generating content-based ratings of media (e.g., video) according to one or more types of objectionable content (e.g., violence) detected using analysis of audio. Instead of requiring human review and labeling for all titles, a media classification system may allow humans to label only a small sample of large pool of unlabeled media content to train a classification model. The media classification system may then use the trained model to automatically review the remaining media content that has not been subjected to human review. Rather than using a narrow set of hand-picked audio-related categories, the media classification system may use a broad audio event characterization scheme to develop a rich audio vocabulary of audio event classes that describe most titles. The audio event classes may be determined based (at least in part) on automated analysis of subtitles, captions, or other textual elements of video. The audio event classes may reflect a rich subcategory vocabulary of types of objectionable content (e.g., types of violent content) because they are not specifically focused on learning a limited number of violence categories like explosions and screams. The media classification system may use audio event classes that may not always be associated with violence, like police-siren sounds or thud sounds, as potentially symptomatic of violence. By using a large set of automatically generated audio event classes, the media classification system may offer a variety of ways to detect violence in many different forms.

The media classification system may leverage both a global view (e.g., a baby songs compilation video is a children's musical) and a local view (e.g., there is single clip with a gunshot in an hour-long title) of the audio events for detection of objectionable content (e.g., violence). The media classification system may use labeled datasets of media content to train an audio event detection (AED)

model for audio recognition and extraction of local and global features. The media classification system may employ pre-processing steps to address the label noise and imbalance in these datasets. The media classification system may transfer learnings from the AED model by using it as a feature extractor for classification of objectionable content (e.g., violence). The AED model may be used to efficiently extract audio features for violence modeling without requiring manual feature engineering or exhaustive search. Using the AED model, the media classification system may leverage both the global view and local view of the audio events for violence detection to build a rich unified local-global audio representation. A global feature (e.g., a global descriptor or embedding) may be obtained by mean-pooling clip-level embeddings from numerous short clips (e.g., clips of a few seconds each) throughout the entire title and may summarize the contents of the full audio at a high-level. Local features may be obtained by max-pooling audio-event probability scores from the clips. The local features may include local information about the most prominent clip containing each specific audio event class modeled by the AED model. The media classification system may train a media classifier model using the local and global features. Using the media classifier model, accurate content descriptor(s) may be determined and/or accurate content-based ratings may be assigned to media titles. In some embodiments, classification may also use a visual modality and/or a textual modality of video content.

As one skilled in the art will appreciate in light of this disclosure, embodiments may be capable of achieving certain technical advantages, including some or all of the following: (1) improving the accuracy of content-based ratings for media content by using machine learning techniques that use both local and global audio features of media content instead of subjective manual review; (2) improving the speed of generating content-based ratings for media content by using automated machine learning techniques that use both local and global audio features of media content instead of subjective manual review; (3) improving the accuracy of content-based ratings for media content by combining machine learning techniques that use both local and global audio features of media content with analysis of other modalities (e.g., video and/or text) of the media content; and so on.

FIG. 1 illustrates an example system environment for media classification using local and global audio features, according to some embodiments. A media classification system 100 may determine one or more content descriptors 145 and/or generate content-based ratings (CBRs) 146 for media content 35, e.g., movies, episodes of television shows, user-uploaded short films, and other video content. A unit of such video content may be referred to as a title. The content-based ratings 146 may represent appropriate age designations or maturity ratings for media content and may allow for informed viewing decisions on a per-title basis. The output of the media classification system 100 may include information that details the type of content included in a title. In some embodiments, this information may include a maturity rating (e.g., rated "PG-13") 146 and/or one or more content descriptors (e.g., "mild violence") 145. In some embodiments, the content descriptors (CDs) 145 may accompany the maturity rating 146 so that the viewer understands the rationale behind a specific rating. A title may be assigned a content-based rating 146 according the amount of objectionable content in one or more categories such as sexuality, violence, offensive language, and substance use in the title.

The video content may be offered to viewers via one or more media streaming services or other media providers. For example, a streaming service or media provider may permit users to browse a catalog or library 30 of available titles, and titles may be listed with their respective content-based ratings. In some embodiments, titles may be filtered according to their content-based ratings, e.g., so that age-inappropriate titles are not presented for some viewers. In some embodiments, streaming services and/or media providers may be clients of the media streaming service 100. For example, the streaming services and/or media providers may use the media streaming service 100 to analyze elements of media content 35 and provide content descriptors 145 and/or content-based ratings 146 for those elements of media content using the techniques described herein. In some cases, before being offered by a streaming service or media provider, titles may be pre-rated by a ratings board that performs such manual review activities. For such titles, the media classification system 100 may be used to verify the original rating and potentially update the rating (e.g., as standards for objectionable content change). In other cases, titles may be initially unreviewed and unrated, e.g., titles original to a particular streaming service or titles uploaded by users.

Prior approaches to generating content-based ratings have included manual review of titles for objectionable content (e.g., sexuality, violence, offensive language, and substance use). The manual review process may be expensive and time-consuming. The manual review process may also yield inaccurate results, e.g., due to the subjectivity of different reviewers. To improve the speed at which ratings are generated and improve the accuracy of the ratings, the media classification system 100 may use machine learning techniques to automate content descriptor classification. Using automated techniques, media classification system 100 may look for elements related to each content descriptor and may assign one of five severity levels (e.g., None, Mild, Moderate, Strong, or Severe) to the elements found in the title. The highest content descriptor severity may then be mapped to a corresponding content-based rating value (e.g., all ages, 7+, 13+, 16+ and 18+) that represents the overall maturity level of the title.

Instead of requiring human review and labeling for all titles, the media classification system 100 may allow humans to label only a small sample of large pool of unlabeled media content 25 to train an audio event detector model 125 that meets performance requirements. The media classification system 100 may then use the pre-trained model 125 to automatically review the remaining media content 35 that has not been subjected to human review and produce a media classifier model 139. In some embodiments, content descriptor classifiers may be thresholded at a high precision for classification in the "None" class because false positives (e.g., a title is classified as having no violence but actually does contain violence) may be highly undesirable for some viewers. To generate accurate content-based ratings 146 and content descriptors 145 for media content 35, the media classification system 100 may perform automatic detection 130 of objectionable content (e.g., violent content) based on audio information. In some embodiments, to improve accuracy further, content-based ratings 146 and/or content descriptors 145 determined using an audio modality may be combined with content-based ratings and/or content descriptors generated using one or more other modalities, e.g., a visual modality based on video content and/or a textual modality based on analysis of subtitles or captions.

Prior approaches for violence detection in video content have used computer vision (CV) and natural language processing (NLP) methods on visual and textual modalities of the video. For some content libraries, these methods can face difficulty in detecting violence due to several challenges including diversity and ambiguity in visual and textual signals, global coverage of subtitles, and lack of multilingual support for textual models. Given the large size and variability of some media libraries, an appropriate definition of violence for a given media library may cover a wide diversity of sub-categories, and the distribution may have a long tail. There may be a diversity in class sub-types like blood violence, weapon violence, slapstick violence, verbal violence, peril, and physical violence, and that diversity can lead to a long-tailed distribution. Additionally, there may be further diversity within sub-types. For example, weapon violence may include various sub-types like guns, swords, blades, grenades, bamboo sticks, fantasy weapons, explosives, and so on. The diversity and the long-tail distribution may add to complexity because supervised learning models may tend to perform well on common inputs (e.g., the head of the distribution) but struggle where examples are sparse (e.g., the tail) and diverse. There may be a diversity in content types, such as reality-based videos, security cam footage, video game streaming, stop-motion animation, works of art, motion pictures and television, and that diversity may also present a challenge. For example, a visual blood detector may fail when color video is not available. There may be ambiguity in signal quality, ranging from low-resolution videos to limited visual signals (e.g., a barely visible gun) and a complete lack of visual signals (e.g., verbal threats).

Additionally, violence classification may be a global problem for some media providers with a global footprint. As a media provider expands into more and more marketplaces and languages, models which can transfer learnings across different parts of the world may become even more desirable. Textual models may rely on subtitles or captions which may not be available for some titles. Even when subtitles or captions are available, textual models used in prior classification approaches may not be marketplace-agnostic or language-agnostic and may yield inaccurate results globally. For example, a textual model based on English will often suffer in a non-English marketplace that lacks English captions. In addition, the subtitles may not contain signals reflecting the presence of violence (e.g., crowd violence). Textual signals may often contain semantic ambiguity (e.g., "I will kill you" vs "kill this project") or no captions reflecting violent content (e.g., slapstick violence).

To address challenges with visual and textual classifiers, the media classification system 100 may use audio modalities for detection 130 of objectionable content such as violence. For example, media titles 35 may contain many situations, such as screaming, where no visual or textual signal or only an ambiguous visual or textual signal is available but where audio cues can be useful for violence detection. Audio signals in media content 35 may also have global coverage, and audio patterns tend to be universal (e.g., gunshots have similar sounds across the world). The system 100 may extract both local 135 and global features 136 of audio signals in order to perform classification according to content descriptors 145 and assign content-based ratings 146 using a component for rating assignment 140. Using a local approach to an audio signal, the system 100 may detect specific localized audio events 135 occurring within a long title (e.g., gunshots). Using a global approach to an audio signal, the system 100 may determine a global or high-level characterization 136 of the entire title (e.g., an action movie vs. a collection of baby songs) that can aid in classification.

Rather than using a narrow set of hand-picked audio-related categories, the media classification system 100 may use a broad audio event characterization scheme to develop a rich audio vocabulary describing most titles. The media classification system 100 may use a set of automatically determined audio event classes 115 to perform classification tasks according to the audio event characterization scheme. Using an audio vocabulary learner 110, a set of common or frequently occurring audio event classes 115 may be derived from automated analysis of a large set of titles 25, e.g., thousands of movies or episodes of television shows found in one or more media libraries 20. In some embodiments, the audio event classes 115 may be derived using open-source media content. The audio event classes 115 may be determined based (at least in part) on automated analysis of subtitles, captions, tags, clip-level metadata, or other textual elements of video. The audio event classes 115 may reflect a rich subcategory vocabulary of types of objectionable content (e.g., types of violent content) because they are not specifically focused on learning a limited number of violence categories like explosions and screams. The audio event classes 115 may include other types of content (e.g., non-objectionable content) as well.

The media classification system 100 may characterize audio by extracting relevant features robust to noise rather than processing raw audio waveforms because clips typically contain noise (e.g., background sounds) and speech in addition to important events for classification, such as gunshots. The media classification system 100 may use audio event classes 115 that may not always be associated with violence, like police-siren sounds or thud sounds, as potentially symptomatic of violence. By using a large set of automatically generated audio event classes 115, the system 100 may offer a variety of ways to detect violence in many different forms. In some embodiments, audio events of interest may be localized to a few segments of the entire audio document (e.g., a gunshot at a particular timestamp) or may be present in the entire audio (e.g., a baby songs compilation). The media classification system 100 may leverage both the global view (e.g., a baby songs compilation video is a children's musical) and local view (e.g., there is single clip with a gunshot in an hour-long title) of the audio events for violence detection.

Using a model training component 120, the media classification system 100 may use large open-source datasets and/or labeled datasets from one or more media libraries 20 to train an audio event detection (AED) model 125 for audio recognition. The media classification system 100 may employ several pre-processing steps to address the label noise and imbalance in these datasets 25. The media classification system 100 may transfer learnings from the AED model 125 by using it as a feature extractor for classification of objectionable content (e.g., violence). The AED model 125 may be used to efficiently extract audio features for violence modeling without requiring manual feature engineering or exhaustive search. In some embodiments, the media classification system 100 may use the AED model 125 on a clip basis (e.g., for short clips within a media title) to generate a sparse set of local audio event categories and probabilities. The media classification system 100 may consider a global view of dense semantic embeddings obtained by removing the output layer of the AED model 125. In some embodiments, the media classification system 100 may use aggregation to obtain a unified local-global fixed length representation for a title. This representation may be used to train the media classifier model 139 on a small set of high-quality, operator-collected content descriptor labels for objectionable content (e.g., violence).

Using the AED model 125, the media classification system 100 may leverage both the global view and local view of the audio events for violence detection to build a rich unified local-global audio representation for violence modeling. In some embodiments, a media classifier model (e.g., for violence classification) 139 may be produced using integration of these two types of representations. The global feature(s) (e.g., a global descriptor or embeddings) 136 may be obtained by mean-pooling clip-level embeddings. Mean-pooling may include determining an average or mean value of numerous short clips throughout the title. A global feature 136 may summarize the contents of the full audio at a high-level into a compact representation. The local audio event category features 135 may be obtained by max-pooling audio-event probability scores. Max-pooling may include determining the clip having the maximum value from a set of short clips of a title. The local features 135 may include local information about the most prominent clip containing each specific audio event class modeled by the AED model. For modeling violence, global embedding features 136 may be useful for learning similarities and discovering related patterns (e.g., for. generalization) while local features 135 may be better for matching against specific events (e.g., for memorization).

To detect the presence of audio events in the audio signal, the media classification system 100 may use a pre-trained audio event detection (AED) model 125 in a component 130 for detection of objectionable content such as violent content. The AED model 125 may be trained on an audio event dataset 25. In some embodiments, the AED model 125 may classify many (e.g., over one hundred) categories 115 of sounds which are most frequently displayed as a part of subtitle files for the deaf and hard of hearing (SDH). The audio categories 115 may include sound effects, music cues, and other background noises which may be important to the on-screen action. The subtitles may be derived from thousands of video titles 25 from one or more media libraries 20. In some embodiments, the subtitles may be used to identify over ten thousand caption types. However, these captions often contain various verb forms of the same word, proper nouns, conjunctions, and prepositions, and other terms that may be less relevant to violence detection. In some embodiments, word2vec static GloVe embeddings in three hundred dimensions may be used calculate the mean embedding for each caption. In some embodiments, K-means clustering may be used to cluster these mean vectors into about two hundred categories. In some embodiments, the number of samples present in each cluster may be calculated, and the top audio event classes or categories may be determined. For example, the most common audio event classes 115 may include: 'applause', 'bang', 'bark', 'beep', 'blare', 'bleat', 'breathe heavily', 'burp', 'buzz', 'chant', 'chatter', 'cheer', 'chime', 'chirp', 'clank', 'clap', 'clatter', 'clear throat', 'click', 'clink', 'cluck', 'coo', 'cough', 'crack', 'crackle', 'crash', 'creak', 'croak', 'cry', 'dial', 'ding', 'door or drawer open or close', 'drill', 'echo', 'engine', 'exclaim', 'exhale', 'explosion', 'fart', 'flapping', 'footstep', 'gasp', 'groan', 'growl', 'grumble', 'grunt', 'gunfire', 'helicopter', 'hiccup', 'hiss', 'honk', 'howl', 'hum', 'inhale or exhale', 'instrument-play', 'jingle', 'knock', 'laugh', 'meow', 'moan', 'moo', 'mosquito', 'muffle', 'music', 'mutter', 'neigh', 'noise', 'not a caption', 'oink', 'others', 'pant', 'pop', 'quack', 'rain', 'rattle', 'revving', 'ring', 'roar', 'rumble', 'rustle', 'scoff', 'scream', 'screech', 'shatter', 'shiver', 'sigh', 'silence', 'siren', 'sizzle', 'snap', 'snarl', 'sneeze', 'sniff', 'snore', 'snort', 'sob', 'song', 'spit', 'squawk', 'squeak', 'squeal', 'static', 'talk', 'thud', 'tick', 'toll', 'tone', 'traffic', 'trill', 'type', 'water run', 'waves', 'whimper', 'whine', 'whirr', 'whisper', 'whistle', 'whoop or whoosh', 'wind', 'yell', and 'yelp'. The audio event classes 115 may exclude: 'others', 'not a caption', and 'silence'.

In some embodiments, media datasets 25 from one or more media libraries and/or open-source datasets 20 may be used to develop the AED model 125. These datasets may include high quality subtitles or captions. The datasets 25 may include thousands of video titles (e.g., movies and television episodes). In some embodiments, the datasets 25 may include thousands of audio clips, e.g., audio clips of up to 15 seconds with one or more tags or labels per clip. For preprocessing, the datasets may be divided into two-second overlapping clips with 50% overlap. Across all datasets, hundreds of thousands of such clips may be produced. To perform feature transformation, log scaled mel-spectrograms of the clip may be used. The mel-spectrograms may use 128 components (bands) covering the frequency range (0-48 kHz), using a window size of 25 ms (1200 samples at 48 kHz) and hop length of 15 ms (720 samples at 48 kHz). This may result in a signal of size R134×128.

In some embodiments, the number of two-second clips per category may vary highly. For example, the imbalance ratio may be up to 7500:1 between the lowest and highest sample classes. To overcome the data imbalance, the system 100 may use various spectrogram augmentation schemes such as time warping of the spectrogram, time stretching and frequency stretching, spectrogram magnitude adjustment by a constant but random factor, and/or introducing time-frequency masking by masking 20% continuous time and frequency bins. In some embodiments, the dataset may be augmented as follows. For each unique string class, the 10th percentile and 85th percentile of magnitude may be calculated. For each class, the augmentation process may take the original sample and compute 'x' augmented samples. The augmented sample may be computed by time warping the spectrogram between 30% and 50%. Following the time warping, the sample may be time and frequency stretched in the range of [0-20%]. The augmentation process may add time-frequency masking in 50% of the samples. The augmentation process may add random instrumental music with a small magnitude to take into account various background scores existing in some of the media. In some embodiments, the augmentation may produce over a million samples across approximately one hundred and twenty original audio event classes 115. One or more models may be trained on this augmented dataset.

Various architectures and machine learning models may be used for audio event recognition by the media classification system 100. In some embodiments, the media classification system 100 may use a VGGish Convolutional Neural Network with Time Distributed layer (CNN-TD). Variants of the VGGish model may include eight layers. For example, a CNN-TD-small model may include 2.9M parameters, and a CNN-TD-large model may include 13M parameters. In some embodiments, the media classification system 100 may use a two-layered bidirectional Gated Recurrent Unit Network (GRU) with two fully connected layers. The GRU network may use the linear combination of the last output layer and may include 0.6M parameters. In some embodiments, the media classification system 100 may use a ResNeXt Convolutional Neural Network (ResNeXt-large) including 27 convolutional layers followed by one linear layer. The ResNeXt-large neural network may include 8.4M parameters and may include four stages, each stage including one bottleneck block. Each bottleneck block may include three convolutional layers, and the number of groups in each stage may be set to eight.

In some embodiments, the media classification system 100 may use cross-entropy (CE) loss for label noise which was present even after human tagging. In some embodiments, the media classification system 100 may use the following hyper-parameter settings for the loss function: clip threshold for gradient clipping=[10, 100, 1000, 10000], weight decay=[1e-07], dropout=0. In some embodiments, for evaluation of accuracy, the media classification system 100 may use several performance measures including accuracy (acc), area under ROC curve (AUC), Precision (P), Recall (R), average Recall (AR), average F-score, top 1 accuracy (top 1 acc), and top 3 accuracy (top3 acc).

In some embodiments, the media classification system 100 may represent the audio content at two different levels 135 and 136. Both representations may be based (at least in part) on features extracted from the audio signal using the AED model 125. In order to characterize the audio, the media classification system 100 may first leverage the class probabilities for the audio event classes 115 discussed earlier. As discussed earlier, the audio event classes 115 may reflect the audio signals commonly observed in many titles. The audio event classes 115 may allow for extraction of important sub-concepts while being robust to noise (e.g., talking and breathing). The audio event classes 115 may be used to extract sub-concepts (e.g., gunshots, sirens, thuds) which may be directly correlated with violence. By training a violence detector 125 using the class probabilities, the media classification system 100 may help the detector memorize these specific sub-concepts.

In some embodiments, the media classification system 100 may use techniques for pooling over time. In models for classification of sequential data, a pooling scheme may be usually adopted to aggregate temporal features and generate a fixed representation for each document. Audio events of interest may be localized to a few segments of the whole audio document (e.g., a gunshot at a particular timestamp) or preset in the whole audio (e.g., an action movie). The media classification system 100 may capture both the global view (e.g., a high-level characterization of a title) 136 and the local view (e.g., there is a single clip with a gunshot in an hour-long title) 135 of the audio events for violence detection. Pooling in general may be a lossy procedure that does not preserve all the information. Max-over-time pooling may take the maximum element over time for each feature value. For each filter, only the largest value in the feature map may be chosen to carry information to subsequent layers. As used by the media classification system 100, max-pooling on audio-event probabilities may help focus and retain information from most activated (salient or prominent) segment in a title corresponding to each audio event class while losing information on the segments containing lower activations. Max-pooling may be used for use cases where only a few segments that contain the relevant audio events may be sufficient for overall violence detection. On the other hand, mean-pooling may retain only some information about all segments in the title and present a global averaged view.

In some embodiments, the audio modality may be used with a visual modality and/or textual modality for increased accuracy of media classification and rating assignment 140. These modalities may be complementary. A detector for one modality may independently learn different patterns from the data, but each detector may have its own weaknesses and strengths. For example, even perfect vision-based detectors may fail when there is a lack or ambiguity in the visual signal. By fusing these learners together, the system 100 may add diversity in the detectors to address the diversity in input data and violence types. A fusion component may produce an aggregative violence score given the learnings produced by several individual subsystems. In some embodiments, probability averaging may be used for improved simplicity and performance. With probability averaging, the fusion component may directly take an average of the title-level violence probabilities of individual detectors to compute the final fused result. This fusion approach may produce high scores when most of the individual detectors indicate the presence of violence, low scores if most do not indicate the presence of violence, and intermediate scores in the case of mixed individual decisions.

Figure 7:
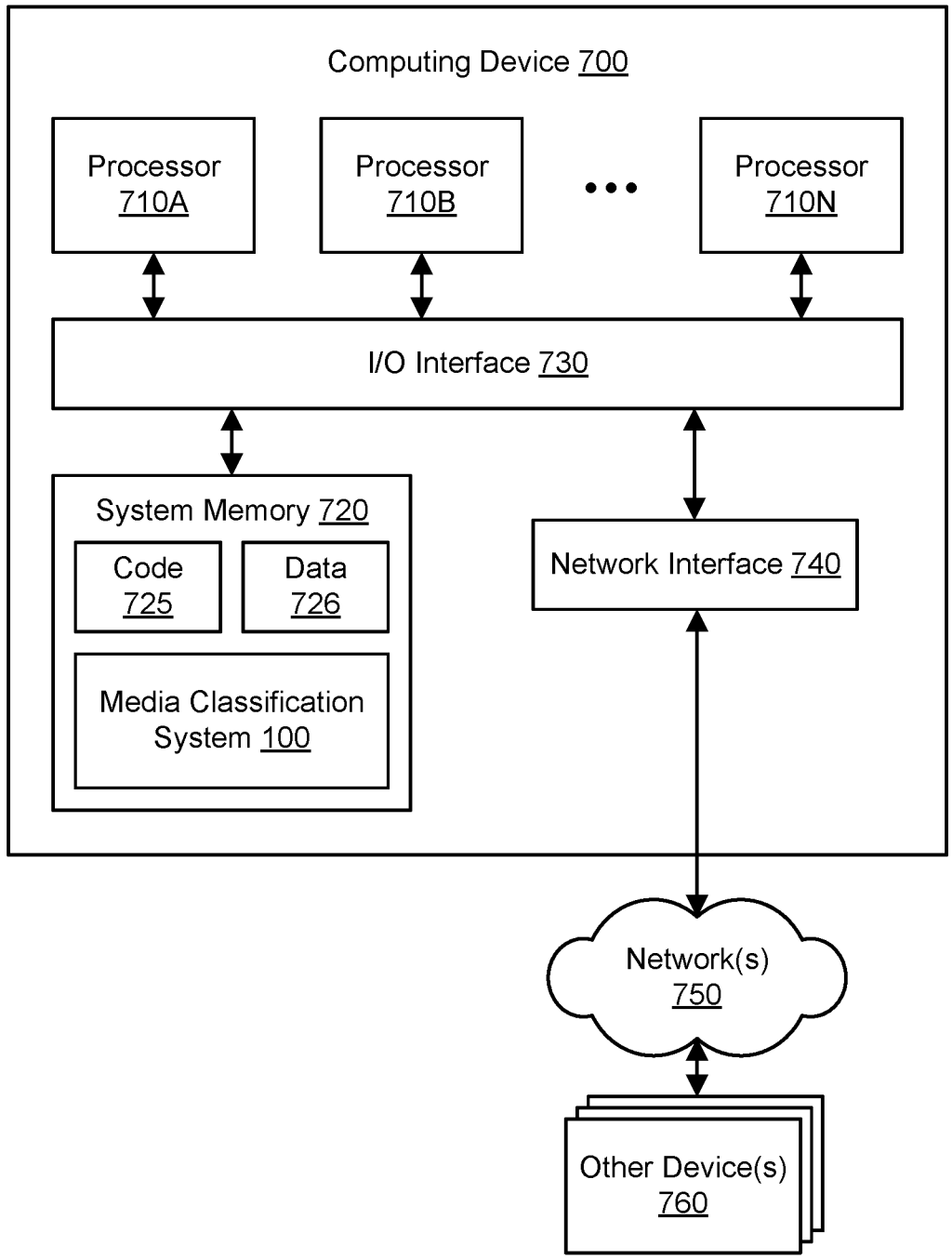
FIG. 7 illustrates an example computing device that may be used in some embodiments.

In various embodiments, components of the media classification system 100 may be implemented using any suitable number and configuration of computing devices, any of which may be implemented by the example computing device 700 illustrated in FIG. 7. In some embodiments, the computing devices may be located in any suitable number of data centers or geographical locations. In various embodiments, at least some of the functionality of the media classification system 100 may be provided by the same computing device or by different computing devices. In various embodiments, if any of the components of the media classification system 100 are implemented using different computing devices, then the components and their respective computing devices may be communicatively coupled, e.g., via one or more networks. Any of the components of the media classification system 100 may represent any combination of software and hardware usable to perform their respective functions. In some embodiments, operations implemented by the media classification system 100 may be performed automatically, e.g., without a need for user initiation or user intervention after an initial configuration stage, and/or programmatically, e.g., by execution of program instructions on at least one computing device. In some embodiments, the media classification system 100 may include additional components not shown, fewer components than shown, or different combinations, configurations, or quantities of the components shown.

Figure 2:
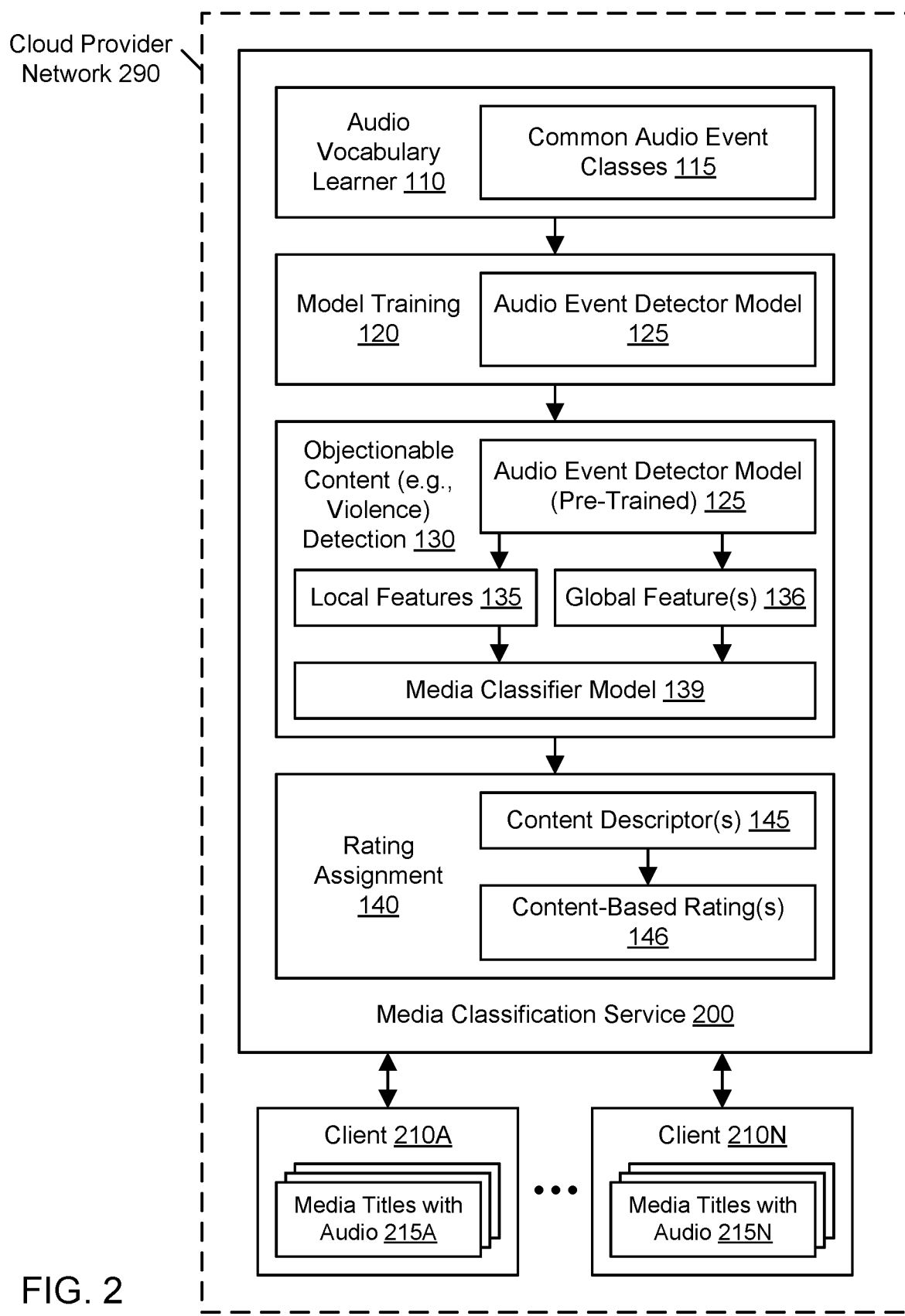
FIG. 2 illustrates further aspects of the example system environment for media classification using local and global audio features, including a cloud provider network that offers media classification as a service, according to some embodiments.

FIG. 2 illustrates further aspects of the example system environment for media classification using local and global audio features, including a cloud provider network that offers media classification as a service, according to some embodiments. In one embodiment, one or more components of the media classification system 100 may be implemented using resources of a provider network 290. Some implementations of the provider network 290 can be a cloud provider network. A cloud provider network 290 (sometimes referred to simply as a "cloud") refers to a pool of network-accessible computing resources (such as compute, storage, and networking resources, applications, and services), which may be virtualized or bare-metal. The cloud 290 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 290 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network 290 via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network 290 may deliver content from points of presence outside of, but networked with, these regions by way of edge locations and regional edge cache servers (points of presence, or PoPs). This compartmentalization and geographic distribution of computing hardware enables the cloud provider network 290 to provide low-latency resource access to customers on a global scale with a high degree of fault tolerance and stability.

The cloud provider network 290 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Computing service(s) may implement various computing resources at one or more data centers. The computing services can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine. A container engine can run on a virtual machine instance in some implementations, with the virtual machine instance selected based at least partly on the described network performance metrics.

The traffic and operations of the cloud provider network 290 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

The cloud provider network 290 may host the media classification system 100 along with other services. Computing services may collaborate according to a service-oriented architecture, e.g., to perform complex tasks requiring contributions from various services. In some embodiments, one or more aspects of the media classification system 100 may be implemented as a service 200 of the provider network 290, the service may be implemented using a plurality of different instances that are distributed throughout one or more networks, and each instance may offer access to the functionality of the service to various clients 210A-210N. Because resources of the provider network 290 may be under the control of multiple clients (or tenants) simultaneously, the provider network may be said to offer multi-tenancy and may be termed a multi-tenant provider network.

Clients 210A-210N of the media classification service 200 may represent external devices, systems, or entities. Clients 210A-210N may seek to have media titles (e.g., media titles with audio 215A and media titles with audio 215N) classified by the media classification service 200. The clients 210A-210N may include streaming services, media providers, or other entities that maintain media libraries. For example, media titles 215A may be part of one or more media libraries maintained by the client 210A and/or offered by the client to streaming customers. The clients 210A-210N may provide media titles 215A-215N as input and receive classifications of those titles (e.g., content descriptors, content-based ratings, and so on) as output of the service 200. The media classification service 200 may customize its various tasks according to client-specific parameters. For example, client 210A may seek to have media titles 215A classified according to a different content-based rating scheme than that sought by client 210N for media titles 215N. As another example, client 210A may seek to have media titles 215A classified according to a different set of content descriptors than that sought by client 210N for media titles 215N. Although FIG. 2 depicts clients 210A-210N as part of the provider network 290, one or more of the clients may be external to the provider network.

In one embodiment, the client devices 210A-210N may be implemented using any suitable number and configuration of computing devices, any of which may be implemented by the example computing device 700 illustrated in FIG. 7. Clients 210A-210N may convey network-based service requests to the media classification service 200 via one or more networks, e.g., to request access to services. The network(s) may encompass any suitable combination of networking hardware and protocols necessary to establish network-based communications between client devices 210A-210N and the media classification service 200. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the media classification service 200 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the media classification service 200. In one embodiment, client devices 210A-210N may communicate with the media classification service 200 using a private network rather than the public Internet. In various embodiments, the various components of the media classification service 200 may also communicate with other components of the service using one or more network interconnects.

Figure 3:
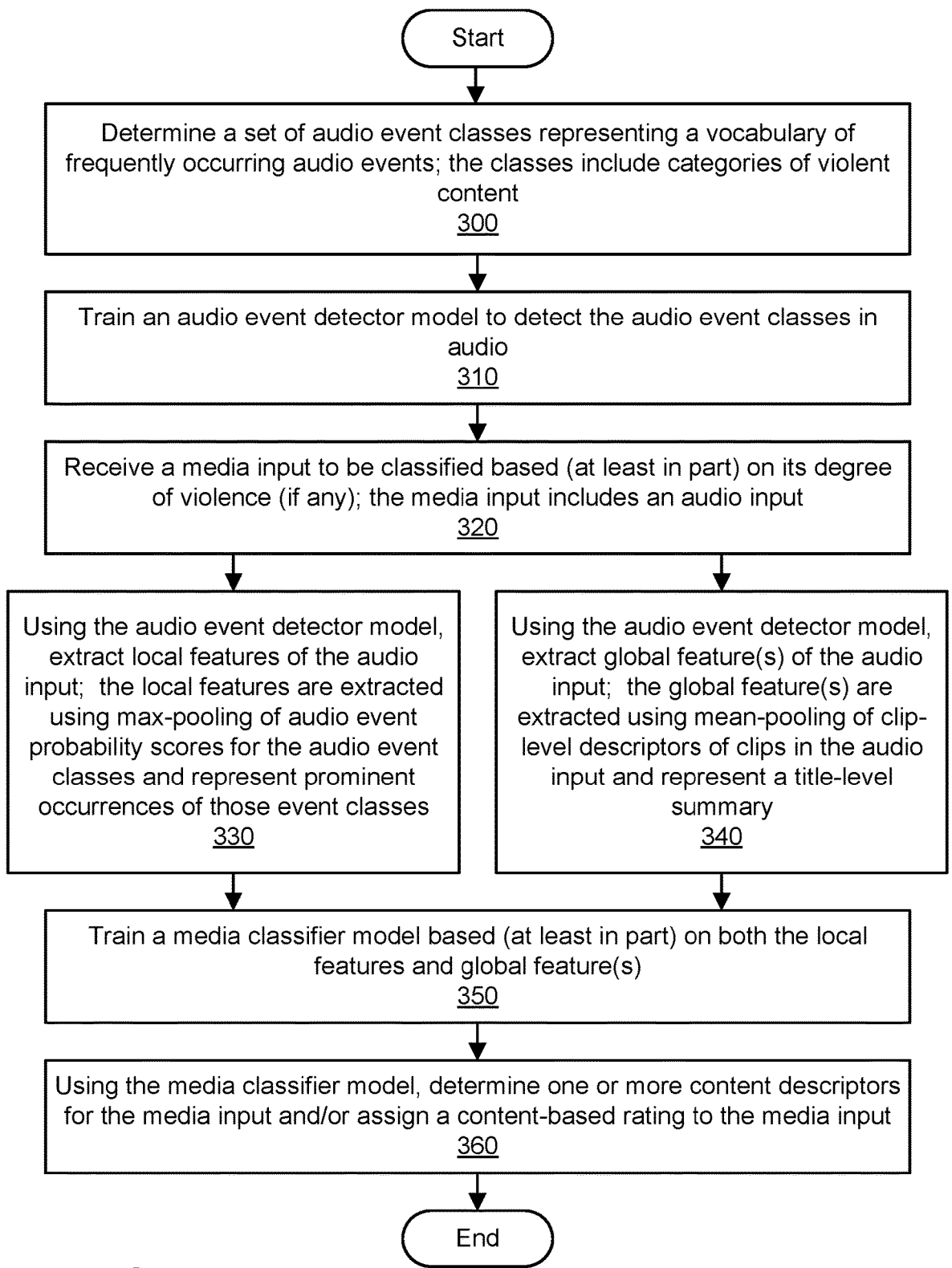
FIG. 3 is a flowchart illustrating a method for media classification using local and global audio features, according to some embodiments.

FIG. 3 is a flowchart illustrating a method for media classification using local and global audio features, according to some embodiments. Rather than using a narrow set of hand-picked audio-related categories, a media classification system may use a broad audio event characterization scheme to develop a rich audio vocabulary describing most titles. As shown in 300, a set of audio event classes may be determined. The audio event classes may be determined based (at least in part) on automated analysis of subtitles, captions, tags, or other textual elements of video. The audio event classes may represent a rich vocabulary of common or frequently occurring audio events. The classes may include categories (and subcategories) of objectionable content, e.g., violent content. The classes may also include categories of non-objectionable content, e.g., nonviolent content.

As shown in 310, an audio event detector model may be trained to detect the audio event classes in audio inputs. The media classification system may use large open-source datasets and/or labeled datasets from one or more media libraries to train the AED model for audio recognition. The media classification system may employ several pre-processing steps to address the label noise and imbalance in these datasets. The media classification system may transfer learnings from the AED model by using it as a feature extractor for classification of objectionable content (e.g., violence).

As shown in 320, a media input (e.g., a video title) that includes an audio input may be received by a media classification system or service. The media classification system or service may use the trained audio event detector (AED) model to extract features usable to classify the media input according to its degree of violent content or other objectionable content, if any. To apply the AED model, the audio input may be divided into smaller clips, e.g., two-second clips having a 50% overlap with adjacent clips. The AED model may be used to efficiently extract audio features for violence modeling without requiring manual feature engineering or exhaustive search. In some embodiments, the media classification system may use the AED model on a clip basis (e.g., for short clips within a media title) to generate a sparse set of local audio event categories and probabilities.

Using the AED model, the media classification system may leverage both the global view and local view of the audio events for violence detection to build a rich unified local-global audio representation for violence modeling. As shown in 330, using the audio event detector model, the method may extract one or more local features of the audio input. The local features may be extracted using max-pooling of audio event probability scores for the audio event classes, such that the most prominent occurrence(s) of particular audio event classes (e.g., portions of the audio input having the highest probability scores for the particular classes) are selected for inclusion in the local features. For example, the local features may include a particular occurrence of a gunshot at a particular time within the audio input.

As shown in 340, using the audio event detector model, the method may extract one or more global features of the audio input. The global feature(s) may be extracted using mean-pooling of clip-level descriptors of the clips in the audio input. The clip-level descriptors may include semantic embeddings. The global feature(s) may represent a title-level summary. For example, the global feature(s) may indicate that the media title including the audio input is an action movie, a musical, or other high-level semantic descriptor.

As shown in 350, based (at least in part) on the local feature(s) and based (at least in part) on the global feature(s), the method may train a media classifier model usable to classify the media input. The media classifier model may be generated, for example, using logistic regression techniques applied to a unified local-global representation of the audio input. As shown in 360, the method may classify the media input using the media classifier model according to the probability that it includes objectionable content (e.g., violent content). For example, the method may determine one or more content descriptors for the media input. As another example, the method may determine a content-based rating for the media input. Using automated techniques, the media classification system may look for elements related to one or more content descriptors (e.g., violence) and may assign one of five severity levels (e.g., None, Mild, Moderate, Strong, or Severe) to the elements found in the title. The highest content descriptor severity may then be mapped to a corresponding content-based rating value (e.g., all ages, 7+, 13+, 16+ and 18+) that represents the overall maturity level of the title.

Figure 4:
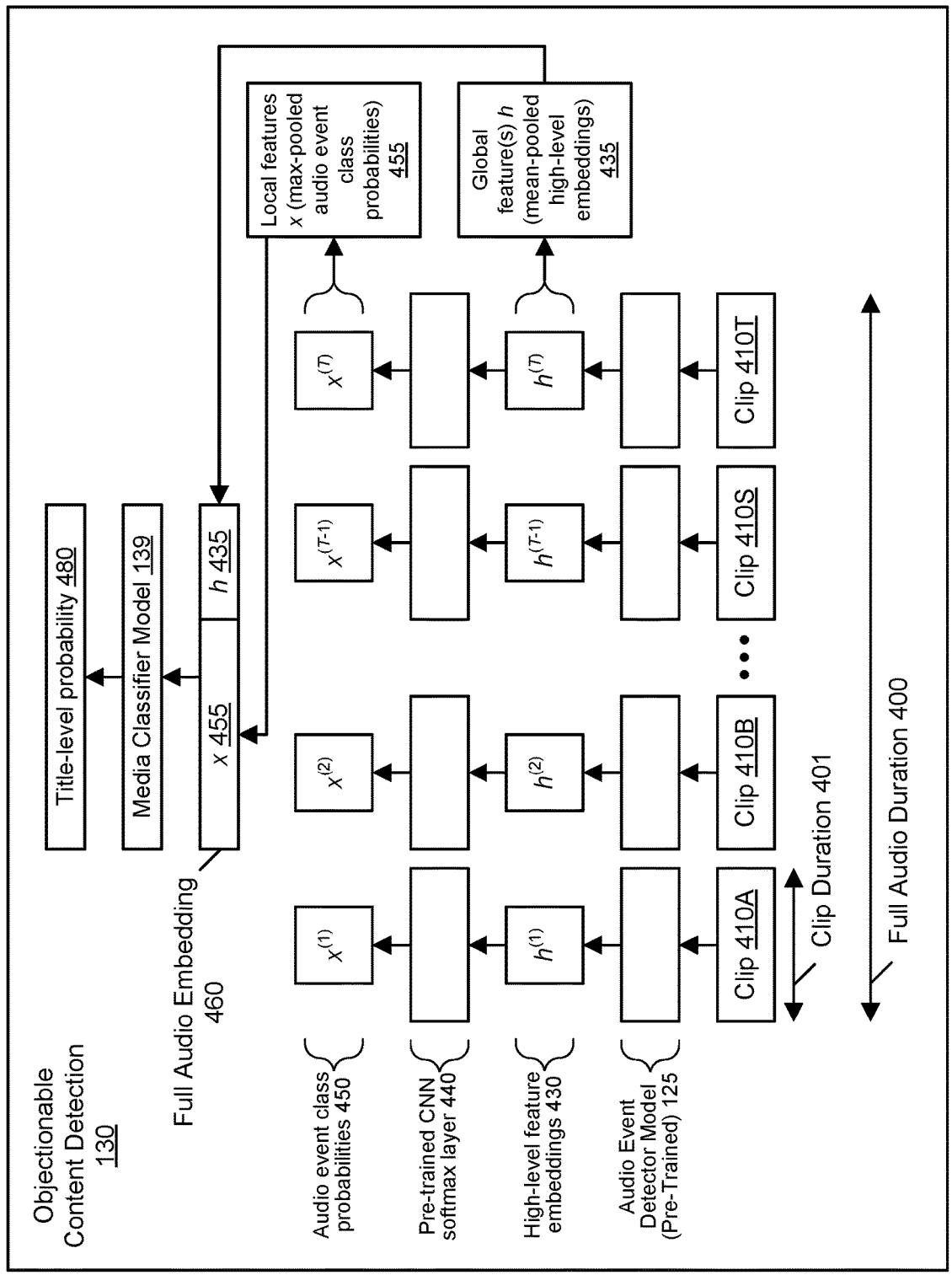
FIG. 4 illustrates further aspects of the example system environment for media classification using local and global audio features, including the use of a pre-trained audio event detector model and a media classifier model, according to some embodiments.

FIG. 4 illustrates further aspects of the example system environment for media classification using local and global audio features, including the use of a pre-trained audio event detector model and a media classifier model, according to some embodiments. In some embodiments, the media classification system 100 may assign content-based ratings 146 based (at least in part) on high-level embedding features. The media classification system 100 may extract semantic embeddings 136 representing global features obtained by removing the output layer of the model. A model based on audio-event probabilities may help in capturing how the occurrence of pre-defined audio events correlates with the violence label. In some cases, events which are not defined in the event space could be relevant for violence detection. For example, a title may lack a clear gunshot event, but there may be a weak or ambiguous mix of gunfire, screaming, or explosions throughout the title. In some embodiments, the AED model 125 may not directly capture any of those weak or ambiguous events explicitly, but by leveraging the embeddings, the AED model 125 may learn and detect such patterns. While audio-event probability features may be explicit, the features learned by the underlying network may be highly implicit and non-linear. The AED model 125 may be able to learn more efficiently by leveraging features from the underlying network. With a model based on low-dimensional dense representations (often called embedding vectors) from the convolutional neural network (CNN), a violence detector may generalize better by matching audio signals which are close together in the embedding space to the violence label and by discovering related audio events. Thus the AED model 125 may stack explicit features for memorization with deep implicit features for generalization.

The AED model 125 may be used to efficiently extract audio features for violence modeling without requiring manual feature engineering or exhaustive search. In some embodiments, the media classification system 100 may use the AED model 125 on a clip basis (e.g., for short clips within a media title) to generate a sparse set of local audio event categories and probabilities. For example, for a particular audio input having a full duration 400, the model may be applied to a set of shorter clips such as clips 410A and 410B through 410S and 410T, where at least some of the clips have a duration 401 shorter than the total duration 400. For example, the clip duration 401 may be two seconds for most clips 410A-410T. Clips may overlap, e.g., by 50% so that sufficient context is captured for portions of the audio input.

As shown in FIG. 4, each clip may be used with the AED model 125, e.g., a pre-trained convolutional neural network (CNN) feature extractor. The model 125 may extract high-level feature embeddings 430 such as $h^{(1)}$ and $h^{(2)}$ through $h^{(T-1)}$ and $h^{(T)}$. The global feature(s) h 435 may be determined by mean-pooling the high-level embeddings over time. In some embodiments, mean-pooling may be perform as follows:

$$h = \frac{1}{T}\sum_{i=1}^{T} h^{(i)}.$$

The model 125 may include a pre-trained convolutional neural network (CNN) softmax layer 440. The model 125 may extract audio event class probability scores 450 such as $x^{(1)}$ and $x^{(2)}$ through $x^{(T-1)}$ and $x^{(T)}$. The local feature(s) x 455 may be determined by max-pooling the audio event class probabilities over time. In some embodiments, max-pooling may be performed as follows:

$$x_k = \max_{1 \le i \le T} x_k^{(i)}.$$

The media classification system 100 may consider a global view of dense semantic embeddings obtained by removing the output layer of the AED model 125. In some embodiments, the media classification system 100 may use aggregation to obtain a unified local-global fixed length representation 460 for a title. This representation may be used to train a media classifier model 139 on a small set of high-quality, operator-collected content descriptor labels for objectionable content (e.g., violence). As shown in FIG. 4, the full audio embedding 460 may include a stack of the local feature(s) x 455 and the global feature(s) h 435. In some embodiments, an output combination layer may concatenate the outputs 455 and 435 and feed the concatenated vector 460 into the media classifier model 139, e.g., a logistic regression layer. In some embodiments, the logistic regression may be performed as follows: p=sigmoid($W_{stack}$+ b).

The media classifier model 139 may then produce a title-level probability 480 for a content descriptor, e.g., a value indicating a likelihood that the title is violent or nonviolent. In some embodiments, the multi-level ratings (e.g., none, mild, moderate, strong, severe) for a content descriptor such as violence may not be independent but may follow a natural order. To generate content-based ratings, the system 100 may perform a threshold-based ordinal regression to transform the title-level violence probability 480 into a multi-level content-based rating (e.g., none, mild, moderate, strong, severe).

In some embodiments, the following is a formula for a two-class classification problem: $p=\sigma([x,h]W+b)$ where $x \in R^d$, $h \in R^m$ are the outputs from the audio-event detector output layer and embedding layer, respectively, $W \in R^{(d+m)}$ is the weight vector for the combination layer, and $\sigma(x)=1/(1+\exp(x))$. The loss function may be the log loss along with a regularization term: $\text{loss}=-y_i \log(p_i)+(1-y_i) \log(1-p_i)+\lambda \|w_1\|^2$, where $p_i$ terms are the probabilities, $y_i$ terms are the true labels, N is the total number of inputs, and $\lambda$, is the L2 regularization parameter.

Figure 5A:
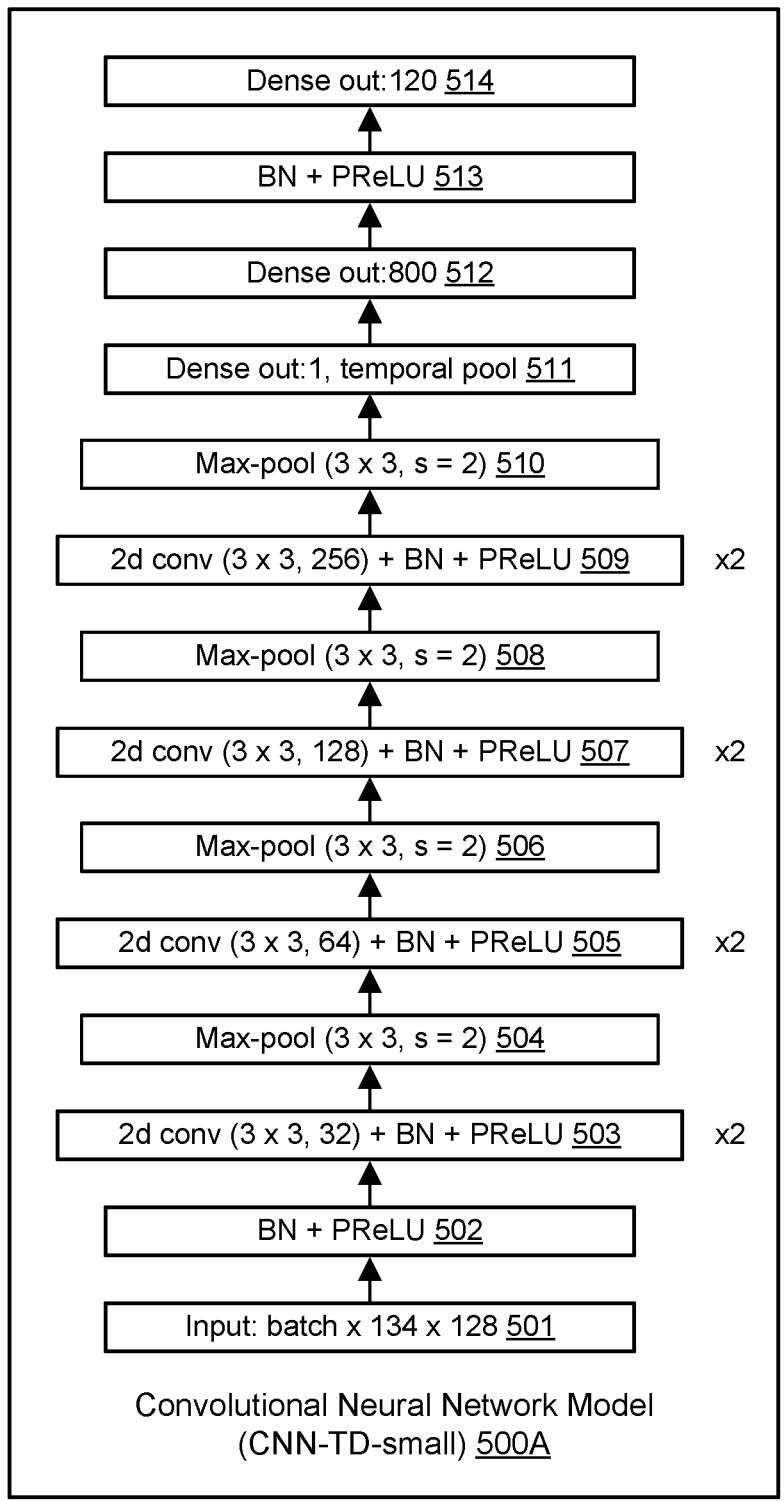
FIG. 5A and FIG. 5B illustrate examples of convolutional neural networks usable to perform audio recognition, according to some embodiments.
Figure 5B:
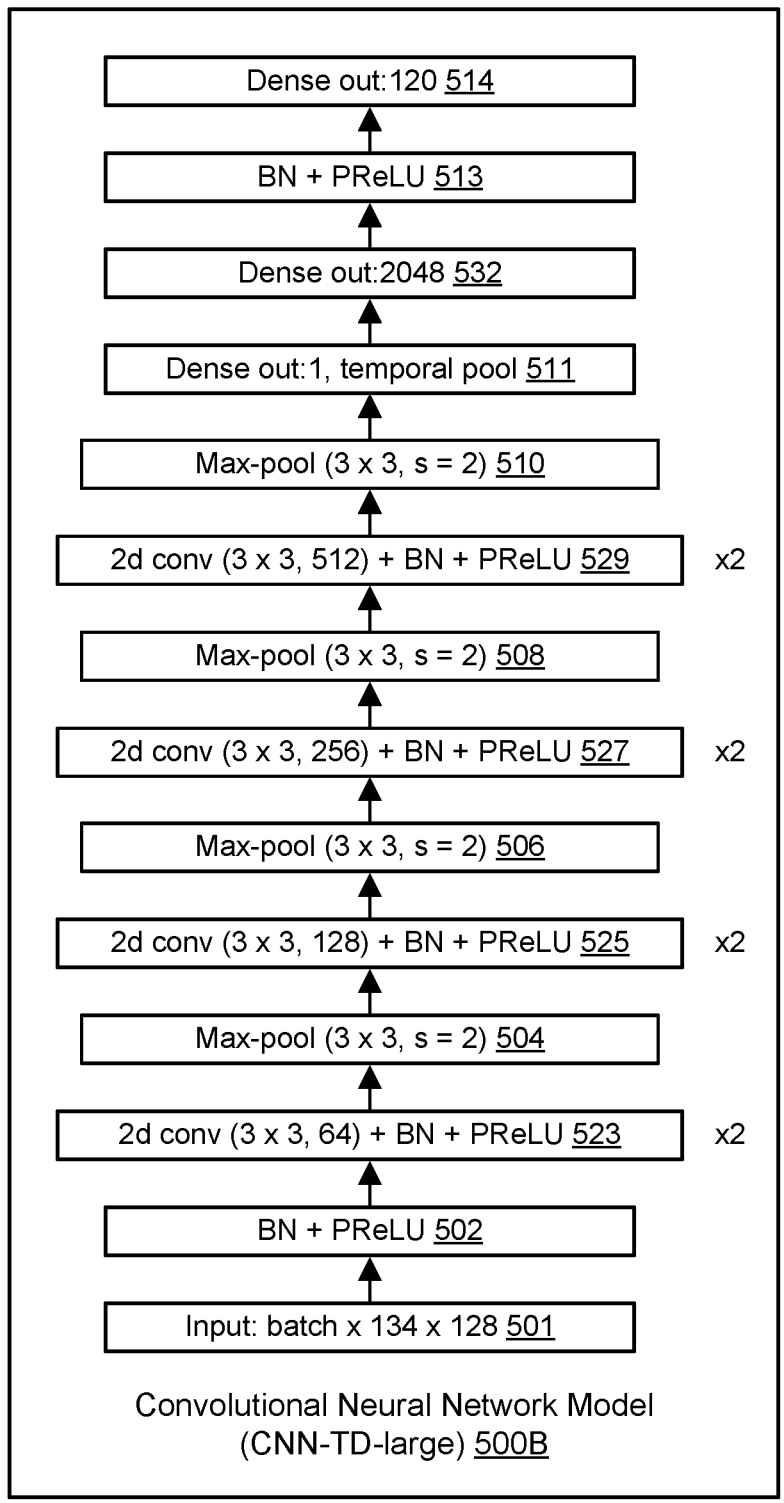

FIG. 5A and FIG. 5B illustrate examples of convolutional neural networks usable to perform audio recognition, according to some embodiments. Various architectures and machine learning models may be used for audio event recognition by the media classification system 100. In some embodiments, the media classification system 100 may use a VGGish Convolutional Neural Network with Time Distributed layer (CNN-TD). Variants of the VGGish model may include eight layers. In some embodiments, a CNN-TD-small model 500A may include 2.9M parameters, and a CNN-TD-large model 500B may include 13M parameters.

As shown in FIG. 5A, the CNN-TD-small model 500A may include input 501. The model 500A may include batch normalization (BN) and a parametric rectified linear (PReLU) activation function 502. The model 500A may include two two-dimensional convolution layers 503 with BN and PReLU, the output of which may be max-pooled 504. The model 500A may include two more two-dimensional convolution layers 505 with BN and PReLU, the output of which may be max-pooled 506. The model 500A may include two further two-dimensional convolution layers 507 with BN and PReLU, the output of which may be max-pooled 507. The model 500A may include two final two-dimensional convolution layers 509 with BN and PReLU, the output of which may be max-pooled 510. The model 500A may further include a dense layer 511 with one output and temporal pooling, another dense layer 512 with 800 outputs, additional BN and PReLU 513, and a dense layer 514 with 120 outputs.

As shown in FIG. 5B, the CNN-TD-large model 500B may include input 501. The model 500B may include batch normalization (BN) and a parametric rectified linear (PReLU) activation function 502. The model 500B may include two two-dimensional convolution layers 523 with BN and PReLU, the output of which may be max-pooled 504. The model 500B may include two more two-dimensional convolution layers 525 with BN and PReLU, the output of which may be max-pooled 506. The model 500B may include two further two-dimensional convolution layers 527 with BN and PReLU, the output of which may be max-pooled 507. The model 500B may include two final two-dimensional convolution layers 529 with BN and PReLU, the output of which may be max-pooled 510. The model 500B may further include a dense layer 511 with one output and temporal pooling, another dense layer 532 with 2048 outputs, additional BN and PReLU 513, and a dense layer 514 with 120 outputs.

Figure 6:
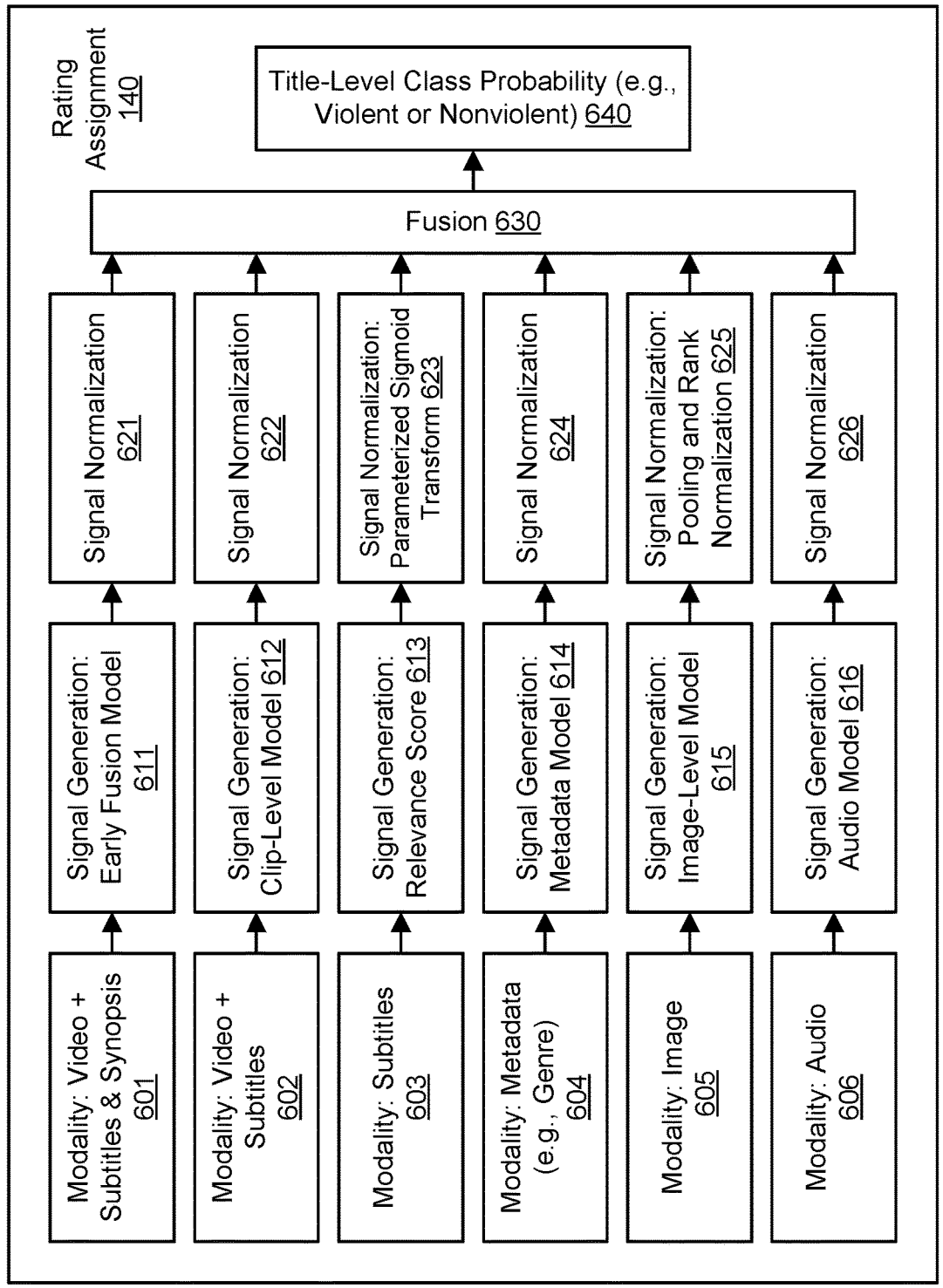
FIG. 6 illustrates further aspects of the example system environment for media classification using local and global audio features, including classification using a combination of different modalities from input media, according to some embodiments.

FIG. 6 illustrates further aspects of the example system environment for media classification using local and global audio features, including classification using a combination of different modalities from input media, according to some embodiments. Using the audio event detector model 125 and media classifier model 139 as discussed above, the accuracy of media classification may be improved. For example, the accuracy of title-level class probabilities (e.g., the title is violent or nonviolent) may be improved, the accuracy of content descriptors may be improved, and the accuracy of content-based ratings may be improved. In some embodiments, the audio event detector model 125 and media classifier model 139 may be combined with models that use one or more other input modalities of a media input to produce even more accurate results. For example, the audio modality may be used with a visual modality and/or textual modality for increased accuracy of media classification. A detector for one modality may independently learn different patterns from the data, but each detector may have its own weaknesses and strengths, e.g., such that vision-based detectors may fail when there is a lack or ambiguity in the visual signal. By fusing these learners together, the system 100 may add diversity in the detectors to address the diversity in input data and violence types.

As shown in FIG. 6, the rating assignment component 140 may generate a title-level class probability 640 (e.g., the title is violent or nonviolent) or other descriptor, rating, or classification for a media input based on two or more modalities of that media input. In some embodiments, the rating assignment component 140 may use the modalities 601 of video, subtitles, and a synopsis with an early fusion model 611 for signal generation and one or more techniques for signal normalization 621. In some embodiments, the rating assignment component 140 may use the modalities 602 of video and subtitles with a clip-level fusion model 612 for signal generation and one or more techniques for signal normalization 622. In some embodiments, the rating assignment component 140 may use the modality 603 of subtitles with a relevance score 613 (e.g., a BM25 relevance score) for signal generation and one or more techniques for signal normalization 623, e.g., a parameterized sigmoid transform. In some embodiments, the rating assignment component 140 may use the modality 604 of metadata (e.g., one or more genres of the title) with a metadata model 614 for signal generation and one or more techniques for signal normalization 624. In some embodiments, the rating assignment component 140 may use the modality 605 of individual image frames with an image-level model 615 for signal generation and one or more techniques for signal normalization 625, e.g., pooling and rank normalization. In some embodiments, as discussed herein, the rating assignment component 140 may use the modality 606 of audio with an audio model 616 (e.g., the audio event detector model 125) for signal generation and one or more techniques for signal normalization 626.

A fusion component 630 may produce an aggregative score 640 given the learnings produced by two or more of the individual subsystems. In some embodiments, probability averaging may be used for improved simplicity and performance. With probability averaging, the fusion component 630 may directly take an average of the title-level violence probabilities of individual detectors to compute the final fused result 640. This fusion approach may produce high scores when most of the individual detectors indicate the presence of violence, low scores if most do not indicate the presence of violence, and intermediate scores in the case of mixed individual decisions.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the media classification system 100 (or media classification service 200) may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a media classification system comprising one or more processors and one or more memories to store computer-executable instructions that, when executed, cause the one or more processors to:
        determine a plurality of audio event classes descriptive of a plurality of categories of content including violent content;
        train an audio event detector model to detect the plurality of audio event classes;
        extract a plurality of local features of an audio input using the audio event detector model, wherein the audio input comprises an audio modality of a video input, wherein the plurality of local features are extracted using max-pooling of audio event scores for individual ones of the plurality of audio event classes;
        extract one or more global features of the audio input using the audio event detector model, wherein the one or more global features are extracted using mean-pooling of a plurality of clip-level descriptors of a plurality of clips of the audio input, and wherein the one or more global features summarize one or more content descriptors including a violent content descriptor in the audio input;
        train a media classifier model based at least in part on the plurality of local features of the audio input and based at least in part on the one or more global features of the audio input; and
        assign a content-based rating to the video input using the media classifier model.

2. The system as recited in claim 1, wherein the one or more memories store additional computer-executable instructions that, when executed, cause the one or more processors to:
    determine one or more additional scores descriptive of violent content in a visual modality of the video input comprising the audio input, wherein the content-based rating for the video input is determined based at least in part on the one or more additional scores.

3. The system as recited in claim 1, wherein the one or more memories store additional computer-executable instructions that, when executed, cause the one or more processors to:
    determine one or more additional scores descriptive of violent content in a textual modality of the video input comprising the audio input, wherein the content-based rating for the video input is determined based at least in part on the one or more additional scores.

4. The system as recited in claim 1, wherein the audio event detector model is used to extract additional local and global features of a plurality of additional video inputs.

5. A method, comprising:
    determining, by a media classification system, a plurality of local features of an audio input using an audio event detector model, wherein the audio event detector model is trained to detect a plurality of audio event classes descriptive of objectionable content, wherein the plurality of local features are determined using one or more maximum values of audio event scores for individual ones of the plurality of audio event classes in the audio input;
    determining, by the media classification system, one or more global features of the audio input using the audio event detector model, wherein the one or more global features are extracted using averaging of a plurality of clip-level descriptors of a plurality of clips of the audio input; and
    determining, by the media classification system, a content-based rating for media comprising the audio input based at least in part on the plurality of local features of the audio input and based at least in part on the one or more global features of the audio input.

6. The method as recited in claim 5, further comprising:
    determining, by the media classification system, one or more additional scores descriptive of objectionable content in a visual modality of the media comprising the audio input, wherein the content-based rating for the media is determined based at least in part on the one or more additional scores.

7. The method as recited in claim 5, further comprising:
    determining, by the media classification system, one or more additional scores descriptive of objectionable content in a textual modality of the media comprising the audio input, wherein the content-based rating for the media is determined based at least in part on the one or more additional scores.

8. The method as recited in claim 5, wherein the media comprising the audio input comprises video, and wherein the objectionable content comprises violent content.

9. The method as recited in claim 5, wherein a violent content descriptor is determined based at least in part on the plurality of local features of the audio input and based at least in part on the one or more global features of the audio input, and wherein the content-based rating for the media is determined based at least in part on the violent content descriptor.

10. The method as recited in claim 5, wherein the plurality of local features are extracted using max-pooling of the audio event scores for the individual ones of the plurality of audio event classes.

11. The method as recited in claim 5, wherein the one or more global features are extracted using mean-pooling of the plurality of clip-level descriptors of the plurality of clips of the audio input.

12. The method as recited in claim 5, further comprising:
determining, by the media classification system, a media classifier model based at least in part on the plurality of local features of the audio input and based at least in part on the one or more global features of the audio input, wherein the content-based rating is determined using the media classifier model.

13. The method as recited in claim 5, wherein the media classification system is implemented as a service of a cloud provider network, and wherein the service is used by a plurality of clients to determine content-based ratings for a plurality of media titles.

14. One or more non-transitory computer-readable storage media storing program instructions that, when executed on or across one or more processors, perform:
determining, by a media classification system, a plurality of local features of an audio input using an audio event detector model, wherein the audio event detector model is trained to detect a plurality of audio event classes descriptive of violent content, wherein the plurality of local features are determined using max-pooling of audio event scores for individual ones of the plurality of audio event classes;
determining, by the media classification system, one or more global features of the audio input using the audio event detector model, wherein the one or more global features are determined using mean-pooling of a plurality of semantic embeddings of a plurality of portions of the audio input; and
determining, by the media classification system, a content-based rating for a video comprising the audio input based at least in part on the plurality of local features of the audio input and based at least in part on the one or more global features of the audio input.

15. The one or more non-transitory computer-readable storage media as recited in claim 14, further comprising additional program instructions that, when executed on or across the one or more processors, perform:
determining, by the media classification system, one or more additional scores descriptive of violent content in a visual modality of the video comprising the audio input, wherein the content-based rating for the video is determined based at least in part on the one or more additional scores.

16. The one or more non-transitory computer-readable storage media as recited in claim 14, further comprising additional program instructions that, when executed on or across the one or more processors, perform:
determining, by the media classification system, one or more additional scores descriptive of violent content in a textual modality of the video comprising the audio input, wherein the content-based rating for the video is determined based at least in part on the one or more additional scores.

17. The one or more non-transitory computer-readable storage media as recited in claim 14, wherein a violent content descriptor is determined based at least in part on the plurality of local features of the audio input and based at least in part on the one or more global features of the audio input, and wherein the content-based rating for the video is determined based at least in part on the violent content descriptor.

18. The one or more non-transitory computer-readable storage media as recited in claim 14, further comprising additional program instructions that, when executed on or across the one or more processors, perform:
training, by the media classification system, a media classifier model based at least in part on the plurality of local features of the audio input and based at least in part on the one or more global features of the audio input, wherein the content-based rating is determined using the media classifier model.

19. The one or more non-transitory computer-readable storage media as recited in claim 14, wherein the media classification system is implemented as a service of a cloud provider network, and wherein the service is offered to a plurality of clients.

20. The one or more non-transitory computer-readable storage media as recited in claim 14, wherein the audio event detector model comprises one or more machine learning models.

* * * * *